United States Patent
Chen et al.

[11] Patent Number: 5,966,459
[45] Date of Patent: *Oct. 12, 1999

[54] AUTOMATIC DEFECT CLASSIFICATION (ADC) RECLASSIFICATION ENGINE

[75] Inventors: Ming Chun Chen, Milpitas; Paul J. Steffan, Elk Grove, both of Calif.

[73] Assignee: Advanced Micro Devices, Inc., Sunnyvale, Calif.

[*] Notice: This patent is subject to a terminal disclaimer.

[21] Appl. No.: 08/896,341

[22] Filed: Jul. 17, 1997

[51] Int. Cl.$^6$ .................................................. G06K 9/00
[52] U.S. Cl. .................. 382/149; 348/126; 364/468.17; 364/490; 382/224; 382/232
[58] Field of Search ..................................... 382/144, 145, 382/146, 147, 148, 149, 150, 278, 141, 224, 232; 348/125, 126, 128; 364/468.28, 468.17, 490; 358/467

[56] References Cited

U.S. PATENT DOCUMENTS

| | | | |
|---|---|---|---|
| 3,864,559 | 2/1975 | Mori et al. | 364/478.12 |
| 4,449,818 | 5/1984 | Yamaguchi et al. | 348/126 |
| 4,618,938 | 10/1986 | Sandland et al. | 382/148 |
| 5,010,551 | 4/1991 | Goldsmith et al. | 395/183.22 |
| 5,014,185 | 5/1991 | Saito et al. | 364/188 |
| 5,086,397 | 2/1992 | Schuster et al. | 364/468.17 |
| 5,539,752 | 7/1996 | Berzin et al. | 364/490 |
| 5,541,846 | 7/1996 | Secrest | 364/468.17 |
| 5,649,169 | 7/1997 | Berezin et al. | 364/468.17 |
| 5,699,447 | 12/1997 | Alumot et al. | 382/145 |
| 5,777,901 | 9/1995 | Berezin et al. | 364/578 |

*Primary Examiner*—Amelia Au
*Assistant Examiner*—Timothy M. Johnson
*Attorney, Agent, or Firm*—H. Donald Nelson

[57] ABSTRACT

A method of determining classification codes for defects occurring in semiconductor manufacturing processes and for storing the information used to determine the classification codes. A wafer is selected from a production lot after the lot is sent through a first manufacturing process. The selected wafer is scanned to determine if there are defects on the wafer. Images of selected defects are examined and a numerical value is assigned to each of N elemental descriptor terms describing each defect. A classification code is determined for each defect based upon the numerical values assigned to the N elemental descriptor terms. The classification code and numerical values assigned to the N elemental descriptor terms are stored in a database. The wafer is sent through each sequential process and classification codes are assigned to additional defects selected after each sequential process. The classification codes and numerical values assigned to the N elemental descriptor terms for the additional selected defects are stored in the database. The stored numerical values assigned to the N elemental descriptor terms to modify the classification code. All of the defects stored in the database are assigned new classification codes in accordance with the modified classification code. A new classification code can be generated and all of the stored defects are assigned new classification codes in accordance with the new database.

5 Claims, 4 Drawing Sheets

AUTOMATIC DEFECT CLASSIFICATION (ADC) RECLASSIFICATION ENGINE

CROSS REFERENCE TO RELATED APPLICATION

This application is related to U.S. application Ser. No. 08/896,340, U.S. Pat. No. 5,862,055, filed on the filing date of this application, entitled AUTOMATIC DEFECT CLASSIFICATION INDIVIDUAL DEFECT PREDICATE VALUE RETENTION AND USAGE.

BACKGROUND OF THE INVENTION

1. Field of the Invention

This invention relates generally to a defect classification methodology in a semiconductor manufacturing testing system and more specifically, to an automatic defect classification methodology that stores information concerning individual defects and uses the stored information to provide new classification codes that are assigned to defects.

2. Discussion of the Related Art

In order to remain competitive, a semiconductor manufacturer must continuously increase the performance of the semiconductor integrated circuits being manufactured and at the same time, reduce the cost of the semiconductor integrated circuits. Part of the increase in performance and the reduction in cost of the semiconductor integrated circuits is accomplished by shrinking the device dimensions and by increasing the number of circuits per unit area on an integrated circuit chip. Another part of reducing the cost of a semiconductor chip is to increase the yield. As is known in the semiconductor manufacturing art, the yield of chips (also known as die) from each wafer is not 100% because of defects during the manufacturing process. The number of good chips obtained from a wafer determines the yield. As can be appreciated, chips that must be discarded because of a defect increases the cost of the remaining usable chips.

A single semiconductor chip can require numerous process steps such as oxidation, etching, metallization and wet chemical cleaning. Some of these process steps involve placing the wafer on which the semiconductor chips are being manufactured into different tools during the manufacturing process. The optimization of each of these process steps requires an understanding of a variety of chemical reactions and physical processes in order to produce high performance, high yield circuits. The ability to view and characterize the surface and interface layers of a semiconductor chip in terms of their morphology, chemical composition and distribution is an invaluable aid to those involved in research and development, process, problem solving, and failure analysis of integrated circuits. A major part of the analysis process is to determine if defects are caused by one of the process tools, and if so, which tool caused the defects.

As the wafer is placed into different tools during manufacture, each of the tools can produce different types of particles that drop onto the wafer and cause defects that have the potential to decrease the yield. In order to develop high yield semiconductor processes and to improve existing ones, it is important to identify the sources of the various particles that cause defects and then to prevent the tools from dropping these particles onto the wafer while the wafers are in the tools.

In order to be able to quickly resolve process or equipment issues in the manufacture of semiconductor products, a great deal of time, effort and money is being expended by semiconductor manufacturers to capture and classify silicon based defects. Once a defect is caught and properly described and classified, work can begin to resolve the cause of the defect and to eliminate the cause of the defect. The biggest problem facing the semiconductor manufacturers and the most difficult problem to solve, is the training and maintenance of a cadre of calibrated human inspectors who can classify all defects consistently and without error. Because of human inconsistency, Automatic Defect Classification (ADC) systems were developed.

One such system for automatically classifying defects consists of the following methodological sequence. Gather a defect image from a review station. View the defect image and assign values to elemental descriptor terms called predicates that are general descriptors such as roundness, brightness, color, hue, graininess, etc. Assign a classification code to the defect based upon the values of all the predicates. A typical ADC system can have 40 or more quantifiable qualities and properties that can be predicates. Each predicate can have a specified range of values and a typical predicate can have a value assigned to it between 1 and 256. A value of 1 indicates that none of the value is present and a value of 256 indicates that the quality represented by the predicate is ideal. For example, a straight line would have a value of 1 for the predicate indicating roundness, whereas a perfect circle would have a value of 256 for the same predicate. The classification code for each defect is determined by the system from the combination of all the predicate values assigned to the defect. The goal of the ADC system is to be able to uniquely describe all the defect types, in such a manner that a single classification code can be assigned to a defect which has been differentiated from all other defect types. This is accomplished by a system administrator who trains an artificial intelligence system to recognize various combinations and permutations of the 40 or more predicates to assign the same classification code to the same type of defect. This would result in a highly significant statistical confidence in the probability that the defect, and all other defects of the same type or class, will always be assigned the same classification code by the ADC system. This is done by performing a "best-fit" calculation against all assigned classification codes. If the fit is not good enough, the system will assign an "unknown" code, which means the system needs further training for that device/ layer/defect. Once the classification code for a particular defect is determined and assigned the predicate values that pertain to that defect and which were used to determine the classification code are not saved. The only value saved in the database is the classification code and, is some cases, the image of the defect. Because there the predicate values are not saved, there is no method available to automatically correct or reclassify defects once they have been stored in the database. At the present, the classifications would have to be edited manually by reviewing each and every defect for which an image was retained (those with no stored image could not be corrected) and assigning the proper value. Alternatively, the wafer would have to be reloaded and the Automatic Defect Classification procedure repeated. This procedure would be appropriate only for the defects at the current process layer for that wafer. This limitation causes known erroneous data to be retained in the database which may then be used by other process/yield models or simulators to predict information such as yield or wafer starts needed.

However, if the classification code needs to be modified to further differentiate between defects, none of the existing defects can be reclassified because none of the information necessary to determine new classification codes is available.

Therefore, what is needed is a system in which the information is stored and which reviews all defects in the database using the stored information and reclassifies the defects to the new classification codes.

SUMMARY OF THE INVENTION

The present invention is directed to a method of determining classification codes for defects occurring in semiconductor manufacturing processes and for storing the information used to determine the classification code. A wafer is selected from a production lot after the lot is sent through a first manufacturing process. The selected wafer is scanned to determine if there are defects on the wafer. Images of selected defects are examined and a numerical value is assigned to each of N elemental descriptor terms describing each defect. A classification code is determined for each defect based upon the numerical values assigned to the N elemental descriptor terms. The classification code and numerical values assigned to the N elemental descriptor terms are stored in a database.

The wafer is sent through each sequential process and classification codes are assigned to addition defects selected after each sequential process. The classification codes and numerical values assigned to the N elemental descriptor terms for the additional selected defects are stored in the database.

The stored numerical values assigned to the N elemental descriptor terms to modify the classification code. All of the defects stored in the database are assigned new classification codes in accordance with the modified classification code.

A new classification code can be generated and all of the stored defects are assigned new classification codes in accordance with the new detabase.

The present invention is better understood upon consideration of the detailed description below, in conjunction with the accompanying drawings. As will become readily apparent to those skilled in the art from the following description, there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiments when read in conjunction with the accompanying drawings, wherein:

DETAILED DESCRIPTION

Reference is now made in detail to a specific embodiment of the present invention which illustrate the best mode presently contemplated by the inventors for practicing the invention.

Figure 1:
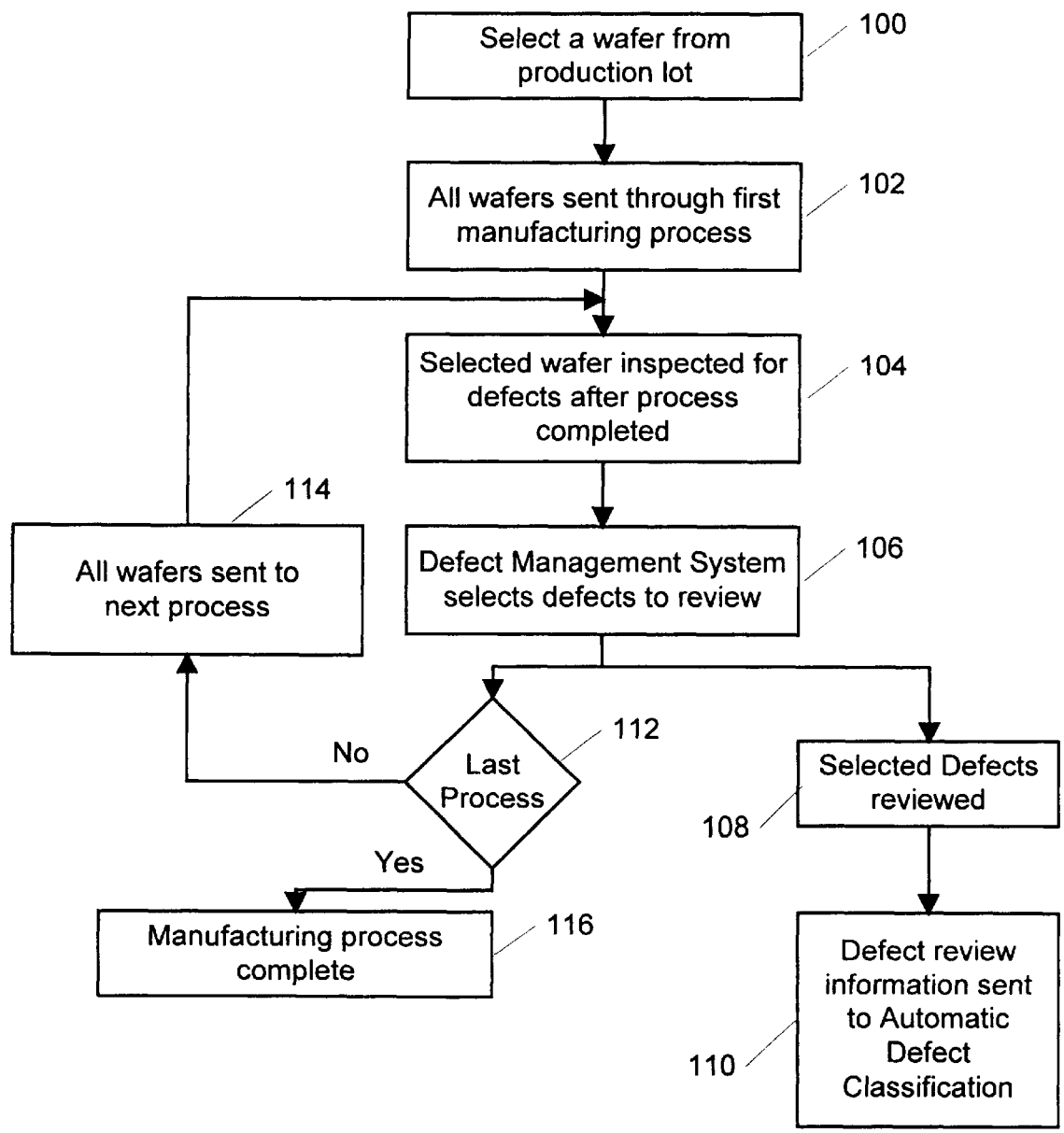
FIG. 1 is a flow diagram describing the movement of a selected wafer through all the processes in the manufacture of semiconductor devices.

FIG. 1 is a flow diagram describing the movement of a selected wafer through all the processes in the manufacturing of semiconductor devices. As is known in the semiconductor manufacturing art, a production lot of wafers can be any selected number of wafers. As is also known in the semiconductor manufacturing art, it is not practical to scan each for defects. Therefore, one wafer is selected from each production lot. This wafer is scanned for defects after each separate manufacturing process. The selection of a wafer is indicated at 100. All wafers in the production are sent through the first manufacturing process 102. After the first process is complete, the selected wafer is examined for defects at 104. The defect management system selects a selected number of the total defects to review at 106. As is known in the semiconductor manufacturing art, the total number of defects on a wafer could be larger than can be practically examined. For this reason, only a selected number of defects are selected for review. The selected defects are reviewed at 108 and the review information is sent to the Automatic Defect Classification at 110. The production lot is cycled to the next process as indicated at 112 and 114. The selected wafer is examined after each sequential process is completed. After the last process is complete, the overall manufacturing process is complete as indicated at 116.

Figure 2:
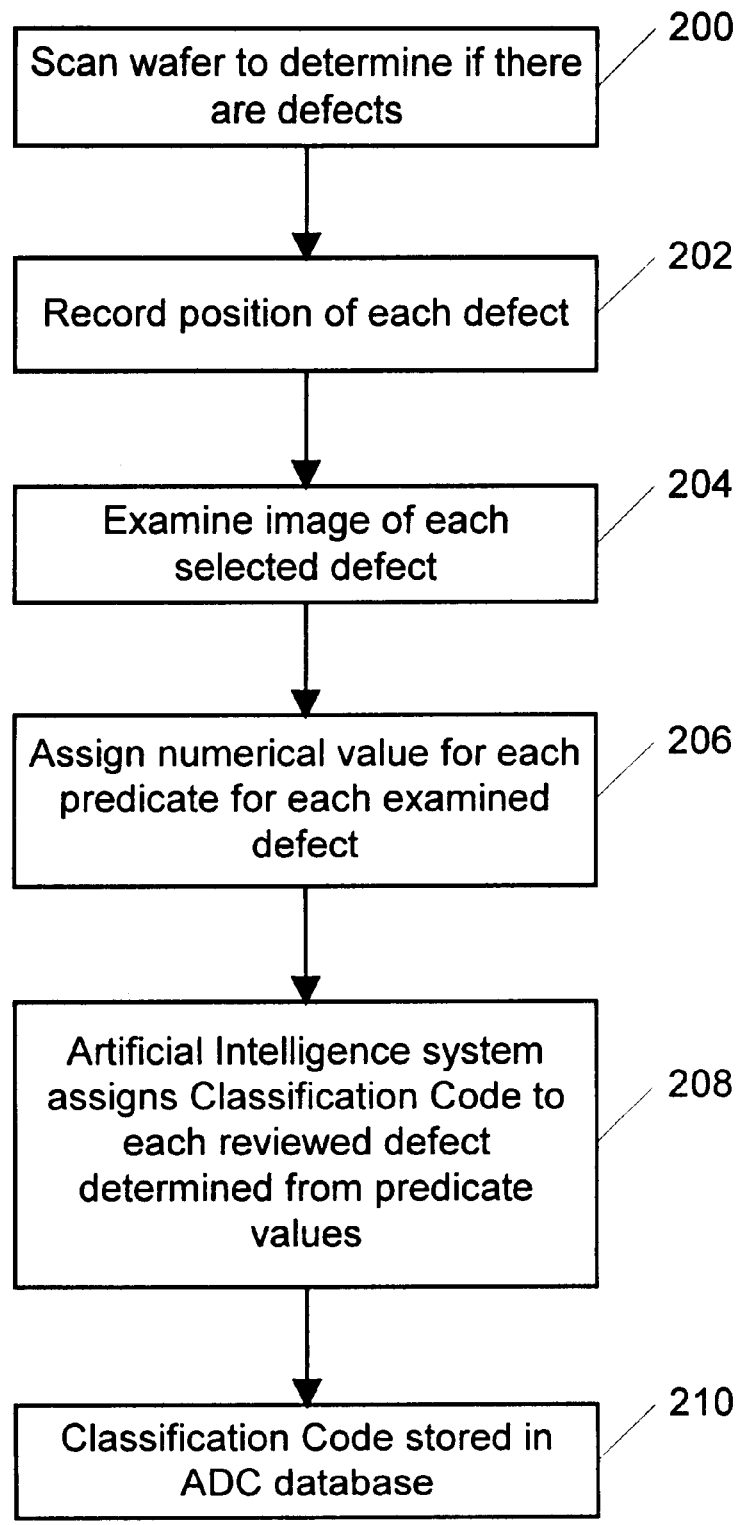
FIG. 2 is a flow diagram describing how a prior art automatic defect classification system determines and stores classification codes for defects.

FIG. 2 is a detailed view of the process of assigning classification codes to defects as done in a typical prior art system. The selected wafer is scanned to determine if there are defects, indicated at 200. The position of each defect is recorded, as indicated at 202, so that the defect can be viewed by another tool such as an imaging tool. As discussed above, the number of defects on the selected wafer may be too large to allow each defect to be examined. For this reason, a given number of defects are selected for further review. An image is made of each selected defect and the images of the selected defects are examined, indicated at 204. Each image has particular quantifiable qualities and properties that can be specified by elemental descriptor terms called predicates. These predicates are general descriptors such as roundness, brightness, color, hue, graininess, etc. There are N number of predicates and N can be 40–60 or more. Each predicate can be assigned a value from a range of values, as indicated at 206. A typical system can have values that can be assigned each predicate that range from 1 to 256. Other ranges are possible. If the range is from 1 to 256, a value of 1 means that none of the quality is present and a value of 256 means that the quality is ideal. For example, a line would have an assigned value of 1 for the quality of roundness, whereas a circle would have an assigned value of 256. The predicates are used in combination to uniquely describe defect types, in such a manner that a single classification code can be assigned to a defect that has differentiated from all other defect types. The classification codes are assigned by an artificial intelligence system that has been programmed by the system administrator or engineer, as indicated at 208. Various combinations and permutations of the N number of predicates are programmed to give a highly significant statistical confidence that the probability that the defect, and all other defects of the same type or class, will be assigned the same classification code. This is done by performing a best-fit calculation against all assigned classification codes. If the fit does not meet a pre-assigned quality standard, an "unknown" code will be assigned, which means that the system needs further training for that particular type of defect. The prior art system shown in FIG. 2 stores the classification code for each defect and discards all of the predicate values.

Figure 3:
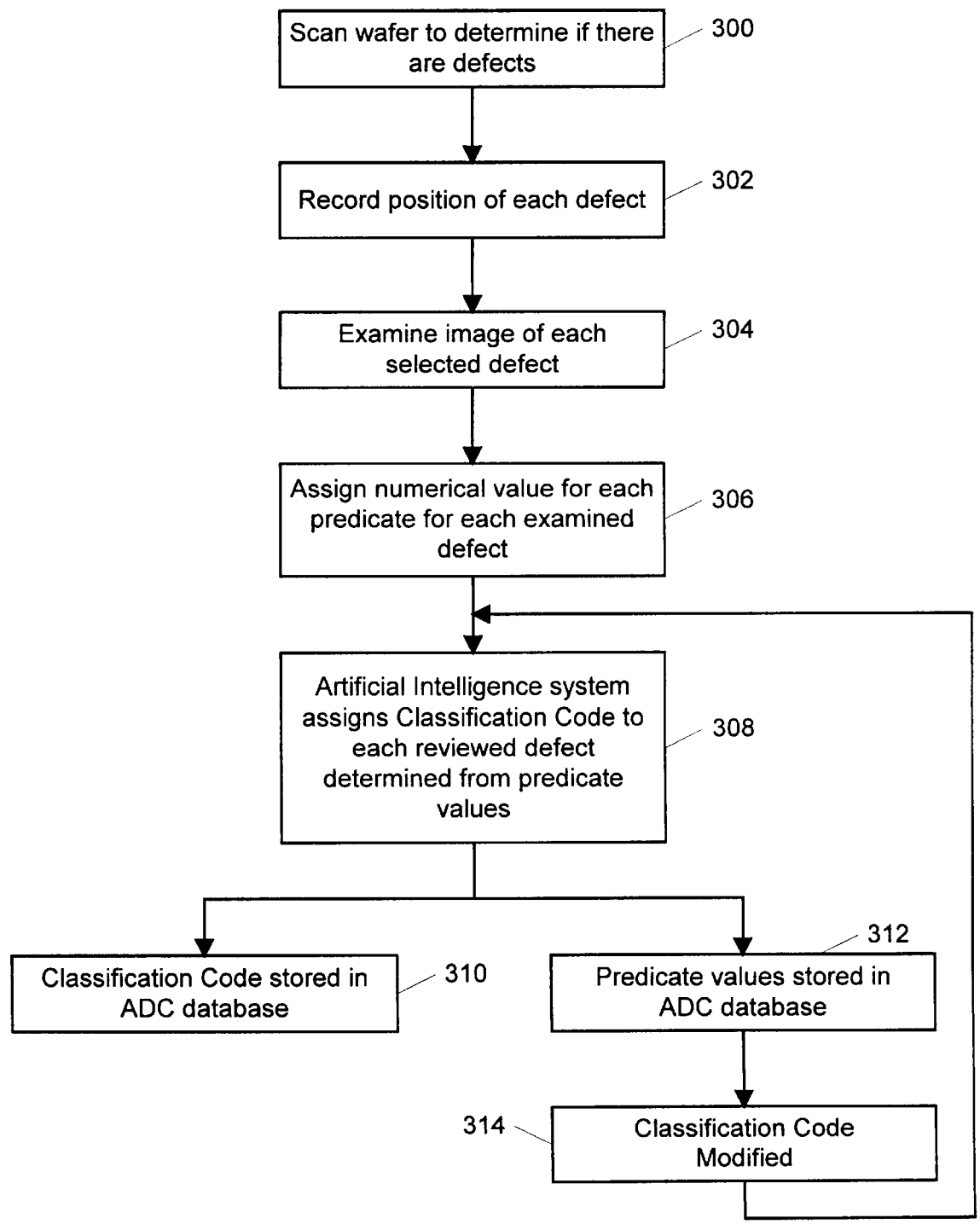
FIG. 3 is a flow diagram describing how an automatic defect classification system according to the present invention determines and stores classification codes for defects.

FIG. 3 is a detailed view of the process of assigning classification codes to defects as done in accordance with the present invention. The selected wafer is scanned to determine if there are defects, indicated at 300. The position of each defect is recorded, as indicated at 302, so that the defect can be viewed by another tool such as an imaging tool. As discussed above, the number of defects on the selected wafer may be too large to allow each defect to be examined. For this reason, a given number of defects are selected for further review. An image is made of each selected defect and the images of the selected defects are examined, indicated at 304. Each image has particular quantifiable qualities and properties that can be specified by elemental descriptor terms called predicates. These predicates are general descriptors such as roundness, brightness, color, hue, graininess, etc. There are N number of predicates and N can be 40–60 or more. Each predicate can be assigned a value from a range of values, as indicated at 306. A typical system can have values that can be assigned each predicate that range from 1 to 256. Other ranges are possible. If the range is from 1 to 256, a value of 1 means that none of the quality is present and a value of 256 means that the quality is ideal. For example, a line would have an assigned value of 1 for the quality of roundness, whereas a circle would have an assigned value of 256. The predicates are used in combination to uniquely describe defect types, in such a manner that a single classification code can be assigned to a defect that has differentiated from all other defect types. The classification codes are assigned by an artificial intelligence system that has been programmed by the system administrator or engineer, as indicated at 308. Various combinations and permutations of the N number of predicates are programmed to give a highly significant statistical confidence that the probability that the defect, and all other defects of the same type or class, will be assigned the same classification code. This is done by performing a best-fit calculation against all assigned classification codes. If the fit does not meet a pre-assigned quality standards an "unknown" code will be assigned, which means that the system needs further training for that particular type of defect. The system shown in FIG. 3, in accordance with the present invention, stores the classification code in the ADC database as indicated at 310. In addition, the system of the present invention stores the predicate values in the ADC database as indicated at 312. The considerations and benefits of storing the predicate values in the ADC database are as follows:

1. The number of predicates used by an ADC system is a relatively small and finite number (typically less than 60) and is conducive to storage in a database without impacting the system storage capacity to a great extent.

2. The predicates contain all the necessary information about the defect for determining an assigned classification code making the codification system extremely flexible.

3. If the classification code change or evolves the entire system can be retroactively corrected to reflect the change using the predicate combinations for each defect to determine how each is affected by that change.

4. If it becomes necessary to create a new code to further differentiate between defects, past defects can be recodified using the new criteria.

5. If a novel approach describing a class of defects is shown effective, the new system can be implemented without losing past information since the previous defects can be reclassified in accordance with the new system.

6. If the system administrator is unavailable for training the system when a new, untrained defect is found, the predicate values are stored and are available to develop new parameters for that defect after the fact.

7. If a new classification code system needs to be set-up, such as one that compares defect information between fabrication areas, it would be possible to retroactively redefine codes and retrain the entire system to match one fabrication area's code with another fabrication area's code exactly such that a true one-to-one comparison can occur.

8. If customized codes are to be used, such as ones that would interest a particular group of scientists or engineers, for example, defects from different modules, the stored predicate values could be used to generate the customized codes.

FIG. 3 shows a step, at 314, where the classification code is modified by automatically correcting or reclassifying defects once they have been stored in the database. The re-classification of the classification code is accomplished by re-examining all the defects stored in the database using the predicate values stored with each defect. The reclassification is run by the system administrator in cases such as when classification codes are added or deleted from the system, if the entire codification system is changed, or if comparing data with another manufacturing center using identical coding. The system administrator retrains the artificial intelligence system when the classification code is modified.

Figure 4:
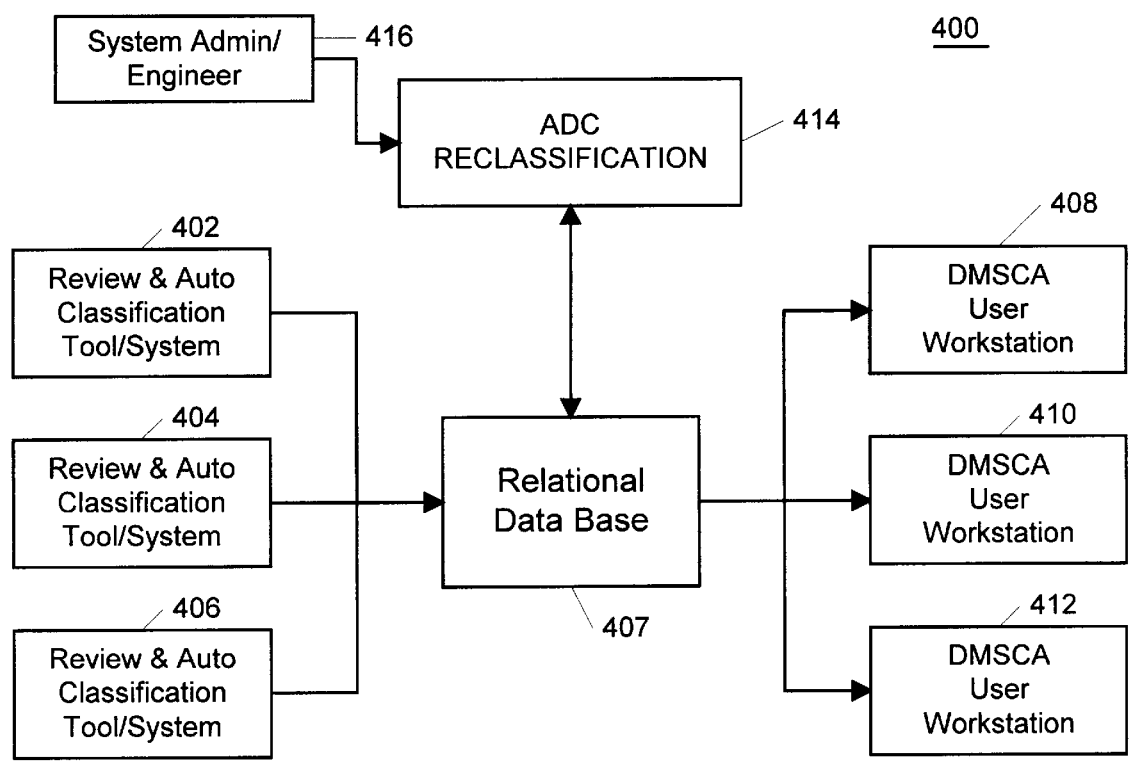
FIG. 4 is a flow diagram showing how the ADC reclassification system in accordance with the present invention relates to the relational database.

FIG. 4 shows a typical automatic defect classification (ADC) system 400. The ADC system has multiple Review & Automatic Classification Tool/Systems, shown at 402, 404, and 406. The information from each of the Review & Automatic Classification Tool/Systems, 402, 404, and 406 is sent to a relational database, indicated at 407. The information can be retrieved from the database 407 by multiple Defect Management System Client Application (DMSCA) User Workstations, shown at 408, 410, and 412 where the data can be to operations such as further processing, further analysis, off-line viewing, and charting. The automatic defect classification (ADC) reclassification, indicated at 414, communicates with the database 407 and when the classification code is modified by the system administrator, indicated at 416, all of the classification codes assigned to the defects stored in the database 407 can be changed. Similarly, if the system administrator 416 generates a new classification code, all of the classification codes assigned to the defects stored in the database 407 can be changed to comply with the new classification code.

The benefits provided by the present invention are:

1. It allows all defects in the entire database to be reclassified easily and accurately.

2. It enables the ability for post-training of new defect types or codes.

3. It improves data consistency and integrity of the database.

4. It eliminates the need for manual reclassification.

5. It maintains maximum flexibility of the ADC codification system.

The foregoing description of the embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of determining classification codes for defects occurring in semiconductor manufacturing processes and for storing the information used to determine the classification codes, the method comprising:

sending a production lot of wafers through a first manufacturing process;

scanning a selected wafer from the production lot to determine if there are defects present on the selected wafer;

selecting defects to review;

examining an image of each selected defect;

assigning a numerical value to each of N elemental descriptor terms describing each defect;

determining a classification code for each defect based upon the numerical values assigned to the N elemental descriptor terms;

storing the classification code and each of the numerical values assigned to the N elemental descriptor terms in a database; and using the stored numerical values assigned to the N elemental descriptor terms to modify the classification code.

2. The method of claim 1, further comprising:

sending the production lot of wafers through a next manufacturing process;

scanning the selected wafer to determine if there are additional defects present on the selected wafer;

selecting additional defects to review;

examining an image of each selected additional defect;

assigning a numerical value to each of the N elemental descriptor terms describing each defect;

determining a classification code for each additional defect based upon the numerical values assigned to the N elemental descriptor terms; and storing the classification code and each of the numerical values assigned to the N elemental descriptor terms in the database.

3. The method of claim 2, further comprising determining a new classification code for all defects stored in the database.

4. The method of claim 2, further comprising determining a new classification code.

5. The method of claim 4, further comprising reclassifying all new defects stored in the database in accordance with the new classification code.

* * * * *